Dec. 24, 1968    H. E. REBENTISCH, JR    3,417,951
PIPE SUPPORT
Filed Oct. 7, 1966
FIG. 1
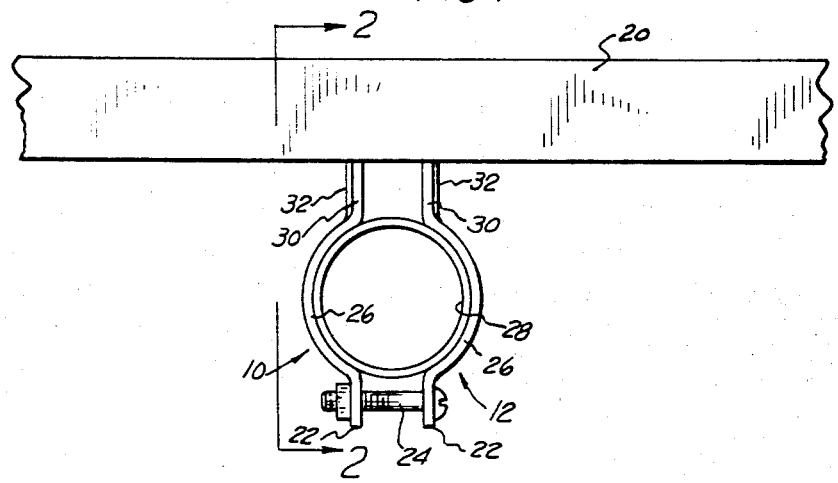
FIG. 2
FIG. 3
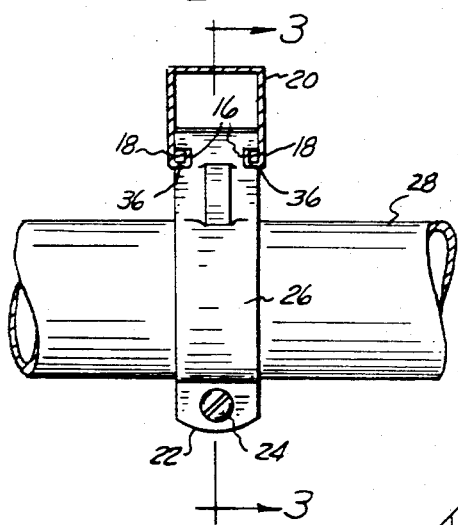
FIG. 4
INVENTOR
HUGO E. REBENTISCH, JR.
BY Hauke, Kruss, & Gifford
ATTORNEYS

United States Patent Office

3,417,951
Patented Dec. 24, 1968

3,417,951
PIPE SUPPORT
Hugo E. Rebentisch, Jr., Wayne, Mich., assignor to Unistrut Corporation, Wayne, Mich., a corporation of Michigan
Filed Oct. 7, 1966, Ser. No. 585,042
2 Claims. (Cl. 248—62)

ABSTRACT OF THE DISCLOSURE

A clamp for attaching a pipe or conduit to a U-shaped channel supporting member with the pipe or conduit spaced from the surface of the channel member. The clamp includes rigid strap sections having an intermediate portion embracing the pipe or conduit, outer ends provided with fastening means and inner ends extending from the intermediate portion and provided with notches for engaging the flanges of the channel sections upon tightening of the fastening means.

---

This invention relates to pipe supports and more specifically to a clamping device for attaching a pipe at a spaced relationship to a supporting member having a pair of inwardly directed, spaced apart flanges defining a longitudinal slot.

It is often necessary in erecting tubing or pipe in buildings, both residential and commercial, that the pipe be spaced from the supporting beam member. Standard practice is to provide a spacing member between the pipe and the supporting member and then to clamp the supporting member, the spacing member and the pipe together by a device which imposes a compressive force on all three members, such as a U-bolt. Another form of supporting device takes the form of an elongated threaded member having an upper end fastened to the supporting member and means provided at the lower end for attachment to the pipe.

It is the broad purpose of the present invention to provide a clamping device which is particularly adapted for supporting a pipe to a supporting member which takes the form of a substantially U-shaped channel having a pair of spaced apart, parallel, inwardly directed flanges and which is commonly known as "Unistrut." The present invention achieves special advantages over clamping devices of the prior art in that it utilizes the longitudinal slot of the supporting member and the spaced apart flanges to achieve a firm attachment to the supporting member. Thus the problem often encountered in the prior art in utilizing a clamping device which embraces the supporting beam as well as the pipe which is often inconvenient due to the presence of other structural members is obviated.

The preferred embodiment of the present invention, which will be subsequently described in detail takes the form of a pair of similar, rigid, strap sections which extend from the slot of the supporting member and each of which is deformed so that together they embrace a section of the periphery of a pipe disposed in spaced apart relationship from and generally transversely to the slot of the supporting member. The outer ends of the straps are provided with overlapping apertured lugs. A threated fastener is received by the aperture and is adapted for moving the lugs toward one another. The inner ends of the straps are disposed in the slots and have side edges provided with a notch having dimensions slightly larger than the flanges and which receive the flanges. The inner ends of the straps are connected to the pipe embracing sections by a pair of extensions spaced apart from one another a distance less than the diameter of the supported pipe. By taking up on the threaded fastener, a compressive force is imposed on the pipe which creates a bending force on the extensions to cause the extreme ends of the clamps disposed in the slot to firmly and rigidly lock with the flanges.

It can therefore be seen that the pipe support of the present invention provides a firmer and stiffer support for attaching pipe to a supporting member than has been available in the prior art. This firm, rigid support is provided by using the slotted structure of the supporting member in combination with a pair of clamping sections. The supporting device of the present invention, in addition to providing a rigid support, is easily engageable with the pipe and the supporting member and easily releasable so that the two members may be separated.

It is therefore an object of the present invention to provide an improved pipe supporting means for firmly attaching a pipe or tubing to a supporting member having a longitudinal slot defined by a pair of inwardly directed spaced apart flanges by providing a pair of clamping sections adapted to substantially embrace a pipe therebetween and having an inner pair of common extreme ends adapted to interengage with the flanges when a compressive force is imposed on a pipe by the application of a force tending to bring the opposite, outer free ends toward one another.

It is another object of the present invention to provide a pipe clamping device for supporting a pipe or tubing to a supporting beam at a spaced apart relationship by providing a pair of clamping sections having a first pair of common ends engageable with the supporting member and a second pair of clamping sections provided with a threaded fastening device for applying a force sufficient to rigidly engage the clamping sections to the pipe and the supporting member.

Still further objects and advantages of the present invention will become obvious to one skilled in the art to which the invention pertains upon reference to the following detailed description. The description makes reference to the accompanying drawing in which like reference characters refer to like parts throughout the several views and in which:

FIGURE 1 is an elevational view of a pipe supporting device illustrating a preferred embodiment of the present invention;

FIGURE 2 is a sectional view of the preferred pipe support taken along line 2—2 of FIGURE 1;

FIGURE 3 is a sectional view taken along line 3—3 of FIGURE 2; and

FIGURE 4 is a sectional view taken along line 4—4 of FIGURE 3.

Now referring to the drawings a preferred pipe clamping device is illustrated as comprising a pair of similar clamping sections 10 and 12. The inner ends 14 of the clamping sections 10 and 12 are disposed within a slot 16 defined by a pair of inwardly directed flanges 18 carried by a hollow elongated structural member 20.

The outer ends of the clamping section 10 and 12 are provided with apertured lugs 22 in spaced apart overlapping relationship. The apertured lugs 22 are adapted to receive a nut and bolt assembly 24 which is adapted to draw the lugs 22 toward one another.

Adjacent the lugs 22, the clamping sections 10 and 12 are rigidly deformed to provide arcuate body sections 26. The inner surface of the body sections 26 has a configuration generally corresponding to the peripherial surface of a tube or pipe 28 which is substantially embraced therebetween.

Each of the body sections 26 develops into an extension section 30 which preferably lies in a plane common with the lugs 22. The extensions 30 have a length sufficient to accommodate the desired spacing of the pipe 28 from the structural member 20.

The extensions 30 are each provided with a centrally located longitudinal reinforcing rib 32. The ribs 32 resist bending moments imposed on the extension 30 and prevent deformation of the extensions which may be produced by severe stress conditions. The extreme inner ends of the clamp sections 10 and 12 are bent away from one another at 34. The ribs 32 run the full length of the extensions 30 from the body sections 26 to the bend 34.

As can best be seen in FIGURE 4, the inner ends 14 of the clamp sections 10 and 12 have a width greater than the slot 16. A pair of generally rectangular notches 36 are provided in the opposite side edges of the inner ends 14 of the clamp sections. The notches 36 have a width such that when the extensions 30 extend perpendicularly to the slots 16, the side edges of the notches will loosely abut the inner and outer edges of the flanges 18. The slots 36 have a combined depth sufficient to permit the inner ends 14 to be disposed transversely to the slot 16.

For attaching the pipe 28 to the structural member 20, the inner ends 14 of the clamping sections 10 and 12 are individually inserted in the slots 16 and rotated such that the notches 36 engage the flanges 18. The clamp sections 10 and 12 are then brought toward one another such that the body sections 26 substantially embrace the pipe 28. The nut and bolt assembly 24 is then engaged with the aperture lugs 22 and the lugs 22 drawn toward one another so that the body sections 26 tightly clamp the pipe 28. As the lugs 22 are drawn toward one another a bending force is developed on the extensions 30 which tends to move the inner ends 14 of the clamp sections 10 and 12 away from one another. The notches 36 then are locked with respect to the flanges 18 to prevent the inner ends 14 from moving away from one another.

Although I have described but one preferred embodiment of my invention, it is to be understood that many modifications and revisions may be made therein without departing from the spirit of the invention as expressed in the scope of the appended claims.

Having described my invention, I claim:

1. A pipe support for supportingly attaching an elongated tube or the like to a supporting member having a pair of spaced apart inwardly directed parallel flanges defining a longitudinal slot, said pipe support comprising,
   (a) a pair of rigid clamping straps each having a clamping section with a contour substantially corresponding to a peripheral section of said tube or the like for cooperatively embracing the tube therebetween,
   (b) said clamping straps having a pair of locking ends disposed within the slot of said supporting member with said locking ends each having corresponding notches provided in the opposite side edges, said notches having a width substantially corresponding to the width of said flanges and adapted to lockingly engage with said parallel flanges defining said slot when said clamping sections impose a compressive force on said tube,
   (c) a sharp bend being formed at the end of said clamping sections to provide an extension between each of said locking ends and said clamping sections, said extensions having a predetermined length sufficient to space said elongated tube from said supporting member,
   (d) said clamping straps having a second pair of spaced apart ends remote from said slot,
   (e) fastening means connecting second pair of ends and operative to bring said ends toward one another so that a compressive force is applied to elongated tube to thereby urge said locking ends into locking engagement with the parallel flanges of said support member,
   (f) said locking ends being bent at said notches relative to said extensions and in a direction away from one another, and
   (g) a longitudinal reinforcing rib formed in said extension between said clamping section and said notches.

2. The pipe support as defined in claim 1, wherein said second ends each include an apertured lug disposed in spaced apart overlapping relationship and further including a threaded fastener for transmitting a force operative to bring said lugs toward one another.

References Cited

UNITED STATES PATENTS

| | | | |
|---|---|---|---|
| 1,837,259 | 12/1931 | Fitzpatrick | 248—74 |
| 1,924,353 | 8/1933 | Fitzpatrick | 248—62 X |
| 2,375,513 | 5/1945 | Bach | 248—62 X |
| 2,846,169 | 8/1958 | Sullivan | 248—62 |
| 2,972,461 | 2/1961 | Balbach et al. | 248—74 X |

ROY D. FRAZIER, *Primary Examiner.*

FRANK DOMOTOR, *Assistant Examiner.*

U.S. Cl. X.R.

248—73